June 24, 1924.
O. N. WISWELL
1,498,827
CUT-OUT OPERATING LEVER FOR AUTOMOBILES
Filed Sept. 18, 1920
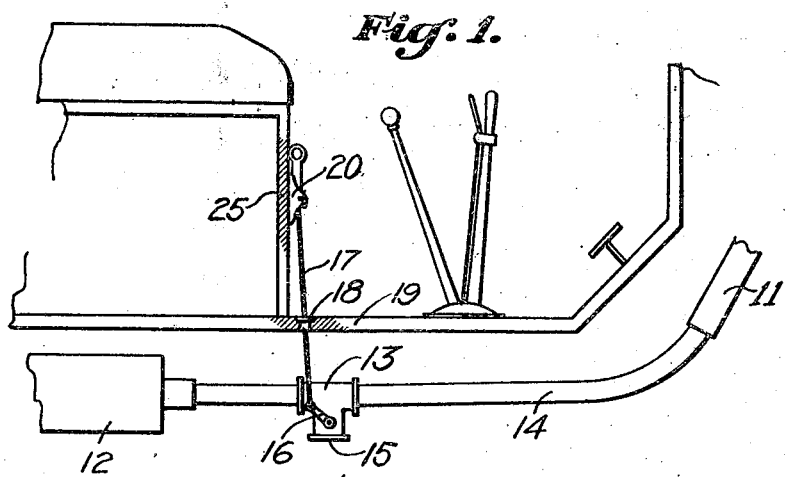
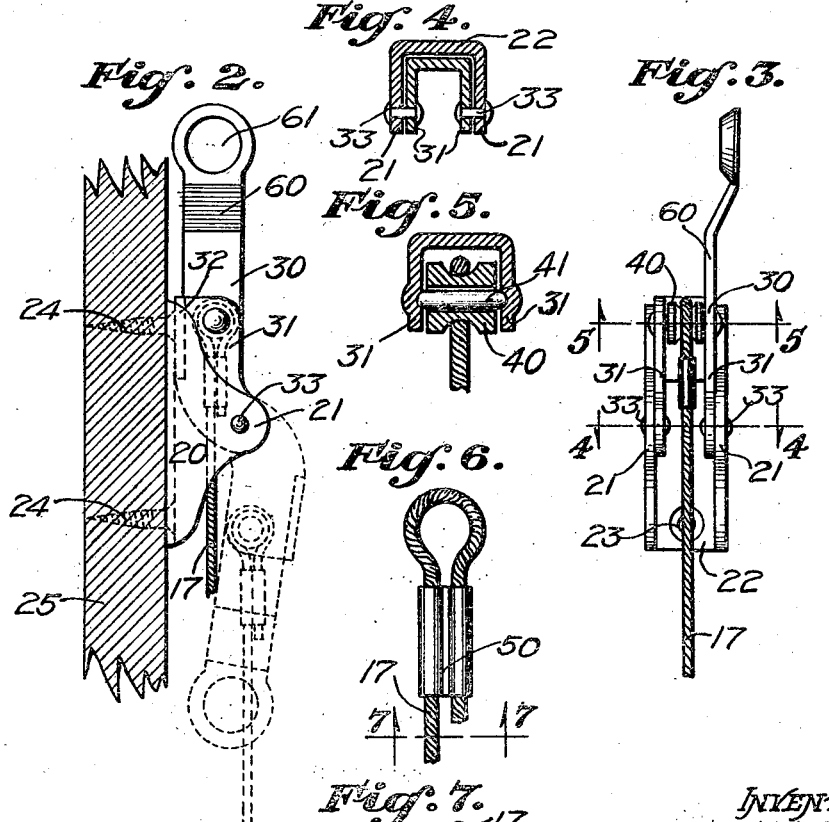
INVENTOR;
OZRO N. WISWELL,
BY Graham + Hauri
ATTORNEYS Patented June 24, 1924.

1,498,827

UNITED STATES PATENT OFFICE.

OZRO N. WISWELL, OF LOS ANGELES, CALIFORNIA.

CUT-OUT-OPERATING LEVER FOR AUTOMOBILES.

Application filed September 18, 1920. Serial No. 411,134.

*To all whom it may concern:*

Be it known that I, OZRO N. WISWELL, a citizen of the United States, residing at Los Angeles, county of Los Angeles, and State of California, have invented a new and useful Cut-Out-Operating Lever for Automobiles, of which the following is a specification.

My invention relates to automobiles and more particularly to the muffler cutout which is commonly placed in the exhaust pipe between the engine and the muffler, this valve being normally closed by a spring which is so arranged that it can be opened to allow the engine to exhaust directly under the automobile without passing through the muffler.

The principal object of the invention is to provide a cutout operating lever which will be of few parts which are readily and cheaply formed.

A further object of the invention is to provide a cut-out which will automatically lock itself in the open position.

Referring to the drawing which is for illustrative purposes only,

Fig. 1 is a diagrammatic section through an automobile equipped with my invention.

Fig. 2 is a side elevation on an enlarged scale of a portion of Fig. 1.

Fig. 3 is a front view of the apparatus shown in Fig. 2.

Fig. 4 is a section on the plane represented by the line 4—4 of Fig. 3.

Fig. 5 is a section on a plane represented by the line 5—5 of Fig. 3.

Fig. 6 is a still further enlarged view of the cable and eye and Fig. 7 is a section on a plane represented by the line 7—7 of Fig. 6.

In the embodiment shown in the drawings, the exhaust manifold of the engine is shown at 11 and the muffler is shown at 12. A muffler cut-out valve 13 is placed in a pipe 14 connecting the manifold 11 with the muffler 12. this cut-out 13 having an opening 15, closed by a valve, not shown, which is operated by a lever 16. This lever tends to move in a counterclockwise direction as seen in Fig. 1 under the influence of a spring, not shown, against the pull of a cable 17 which passes through a bushing 18 in the floor 19 of the automobile. Muffler cutouts of this description are old in the art and the one shown is merely illustrative of a class and forms no portion of my invention.

For the purpose of operating the cable 17, I provide a bracket 20 which is formed of sheet metal having two parallel journals 21 formed at either side thereof, these journals being connected by a base 22 which is provided with holes 23 through which screws 24 may pass thus securing the cut-out to the woodwork 25 of the automobile.

An operating lever 30 also formed of sheet metal is placed between the journals 21, this operating lever consisting of side members 31 connected by a web 32. Two rivets 33 are provided each passing through one of the journals 21 and one of the side members 31, leaving a clear space inside of and between the side members 31 in which the cable 17 may lie. A thimble 40 is secured on a pin 41 between the side members 31 and the cable 17 passes therearound.

For the purpose of securing the cable I provide the sleeve construction shown in Figs. 6 and 7 in which the cable 17 is shown passing through a metal member 50 having two parallel channels 51 in which the cable 17 lies. The member 50 may be formed from copper tubing which is punched flat about forming members to form the channels 51. Forming a portion of the operating lever 30 is a handle 60 which is an extension of one of the side members 31 and which is provided with an upwardly extending portion, having a hole 61 therein. The pin 41 may be conveniently secured as shown in Fig. 5 by forming cups in the side members 31.

The method of operation of my invention is as follows:

The operating lever 30 being in the position shown in dotted lines in Fig. 2, the cable 17 is slack and the lever 16 is free to turn in a counterclockwise direction from the position shown in Fig. 1 to entirely close the valve in the muffler cut-out 13. When it is desired to open this cut-out, the driver of the car inserts his finger in the hole 61 and rotates the lever 30 from the position shown in dotted lines in Fig. 2 into the position shown in full lines in Figs. 1, 2 and 3. This pulls upwardly on the cable 17, opening the valve 16.

It should be noted that the cable 17 with the lever in the position shown in full lines in Fig. 2 passes between the rivets 33 and brackets 20. The spring on the lever 16 holding the cable 17 taut thus tends to lock the lever 30 in the raised position as shown in full lines in Figs. 1, 2 and 3 so that the cut-out will stay open until released by the driver pulling outwardly from the woodwork 25 on the lever 61, and allowing it to drop from the position shown in full lines in Fig. 2 to the position shown in dotted lines in that figure.

I claim as my invention:

1. A cutout operating lever comprising a bracket formed of sheet metal and having a base and two parallel journals extending outwardly at right angles to said base; an operating lever formed of sheet metal and comprising two parallel side members fitting between said journals and a web connecting same substantially at right angles thereto; two rivets on the same axis, each rivet passing through one of said journals and its associated side member, there being a clear space between said rivets between said side members; an extension formed on one of said side members having a hole into which an operator can insert his finger to operate said operating lever; an operating cable of suitable size to pass through this clear space; and means for securing said operating cable to said operating lever.

2. A cutout operating lever comprising a bracket formed of sheet metal and having a base and two parallel journals extending outwardly at right angles to said base; an operating lever formed of sheet metal and comprising two parallel side members fitting between said journals and a web connecting same substantially at right angles thereto; two rivets on the same axis, each rivet passing through one of said journals and its associated side member, there being a clear space between said rivets between said side members; an extension formed on one of said side members having a hole into which an operator can insert his finger to operate said operating lever; an operating cable of suitable size to pass through this clear space; and means for securing said operating cable to said operating lever, said parts being so arranged that the pull of said operating cable locks said operating lever in either the open or closed position thereof.

3. A cutout operating lever comprising a bracket formed of sheet metal and having a base and two parallel journals extending outwardly at right angles to said base; an operating lever formed of sheet metal and comprising two parallel side members fitting between said journals and a web connecting same substantially at right angles thereto; two rivets on the same axis, each rivet passing through one of said journals and its associated side member, there being a clear space between said rivets between said side members; an extension formed on one of said side members having a hole into which an operator can insert his finger to operate said operating lever; an operating cable of suitable size to pass through this clear space; a thimble secured between said side members; and means for securing said cable to said thimble, said parts being so arranged that the pull of said operating cable locks said operating lever in either the open or closed position thereof.

4. In a cutout operating lever, the combination of: a bracket; a lever mounted upon said bracket, said lever having a pair of parallel side members with oppositely disposed depressions formed upon the inner surfaces of said side members; a pin secured between said side members by having the ends thereof seated in said depressions; and means for attaching a cable to said pin.

5. In a cutout operating lever, the combination of: a bracket; a lever mounted upon said bracket, said lever having a pair of parallel side members with oppositely disposed depressions formed upon the inner surfaces of said side members; a pin secured between said side members by having the ends thereof seated in said depressions; means for attaching a cable to said pin; and a ring formed at the outer end of said lever for finger engagement whereby said lever may be operated.

In testimony whereof, I have hereunto set my hand at Los Angeles, California, this 11th day of September, 1920.

OZRO N. WISWELL.